United States Patent [19]

Kramer et al.

[11] 4,279,801

[45] Jul. 21, 1981

[54] THERMOPLASTIC MOLDING COMPOSITIONS OF A LINEAR POLYESTER AND A POLY(ESTER URETHANE)

[75] Inventors: Morton Kramer, Pittsfield, Mass.; Allen D. Wambach, Evansville, Ind.

[73] Assignee: General Electric Company, Pittsfield, Mass.

[21] Appl. No.: 592,769

[22] Filed: Jul. 2, 1975

[51] Int. Cl.³ ..................... C08L 67/02; C08L 75/06
[52] U.S. Cl. ................... 260/40 R; 525/440; 260/45.85 B
[58] Field of Search ............. 260/858, 40 R; 525/440

[56] References Cited

U.S. PATENT DOCUMENTS

| | | | |
|---|---|---|---|
| 3,382,305 | 5/1968 | Breen | 260/858 |
| 3,563,849 | 2/1971 | Rye | 260/858 |
| 3,649,541 | 3/1972 | Ingersoll | 260/858 |
| 3,886,229 | 5/1975 | Hutchinson | 260/859R |
| 3,968,182 | 7/1976 | Inoue | 260/858 |

FOREIGN PATENT DOCUMENTS

| | | | |
|---|---|---|---|
| 132546 | 5/1949 | Australia | 260/858 |
| 820807 | 4/1975 | Belgium . | |
| 2350852 | 4/1975 | Fed. Rep. of Germany . | |
| 2247506 | 5/1975 | France . | |
| 50-78649 | 6/1975 | Japan . | |
| 7413354 | 4/1975 | Netherlands . | |
| 1279673 | 6/1972 | United Kingdom | 260/858 |
| 1475562 | 6/1977 | United Kingdom . | |

*Primary Examiner*—Paul Lieberman
*Attorney, Agent, or Firm*—Morgan, Finnegan, Pine, Foley & Lee

[57] ABSTRACT

Novel thermoplastic molding compositions are disclosed which are based on the combination of a linear thermoplastic polyester and a thermoplastic poly(esterurethane).

8 Claims, No Drawings

THERMOPLASTIC MOLDING COMPOSITIONS OF A LINEAR POLYESTER AND A POLY(ESTER URETHANE)

The present invention provides novel thermoplastic molding compositions which comprise a linear thermoplastic polyester and a thermoplastic poly(ester-urethane).

BACKGROUND OF THE INVENTION

In the prior art, the high molecular weight linear polyesters and copolyesters of terephthalic and isophthalic acid are well known materials. They are described in the Whinfield et al Patent, U.S. Pat. No. 2,465,319 and Pengilly, U.S. Pat. No. 3,047,539 which are hereby incorporated by reference.

The linear polyesters have many properties such as a high heat distortion temperature, stiffness, solvent resistance and toughness which make them useful for many purposes. For many applications, it is desirable to upgrade the impact strength so that articles made of these polymers will not break when subjected to shock loading.

It has now been found that the addition of a thermoplastic poly(ester-urethane) to a linear polyester resin, will upgrade the impact strength without excessive loss of heat deflection temperature, tensile strength and flexural modulus. Also, it has been unexpectedly found that the thermoplastic poly(ester-urethanes) exhibit an excellent degree of compatibility when added to the thermoplastic linear polyesters. These blends show a degree of compatibility that occurs apparently on a molecular scale. The molded samples exhibit no evidence of separate phases such as delamination that occurs in incompatible polymer blends. Similar results have been noted in glass reinforced blends that have been prepared and tested.

It is, therefore, a primary object of this invention to provide novel linear polyester compositions that have improved impact strength.

DETAILED DESCRIPTION OF THE INVENTION

The present invention provides novel thermoplastic molding compositions which comprises:
(a) a high molecular weight linear polyester; and
(b) a thermoplastic poly(ester-urethane)elastomer.

The linear polyester is selected from the group consisting of polymeric glycol terephthalate and isophthalate esters having repeating units of the formula:

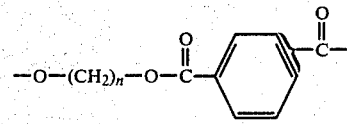

wherein n is a whole number of from 2 to 4 and mixtures of said esters. Useful members of this group of compounds include poly(1,4-butylene terephthalate) and poly(ethylene terephthalate). Also included are branched copolyesters which are branched either by cross-linking through chemical linkages or in other known manners. They may contain minor amounts, e.g., from 0.5 to 15 mole percent of the total 1,4-butylene units, of other aliphatic linkages, e.g. those of from 2 to 10 carbon atoms such as dimethylene, trimethylene, hexamethylene, decamethylene, and the like, linkages as well as cycloaliphatic, e.g., 1,4-dimethylene-cyclohexane linkages. In addition to the terephthalic acid units, other dicarboxylic acid units, such as adipic, naphthalene dicarboxylic, isophthalic and orthophthalic units may be present in small amounts, e.g., from about 0.5 to about 15 mole percent of the total acid units.

Especially useful are branched high-melt viscosity poly(1,4-butylene terephthalate) resins, which include a small amount of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or, preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate.

The relative amount of the branching component can vary, but is always kept at a minor proportion, e.g., of up to 5 mole percent maximum, for every 100 moles of the terephthalate units in the branched polyester. Preferably, the range of branching component included in the esterification mixture (and, generally, that included in the product), will be from 0.01 to 3 mole percent based on the terephthalate units. The especially preferred range will be from 0.02 to about 1 mole percent based on the terephthalate component.

Processes for preparing the polyester starting materials used in this process are well known to those skilled in the art. The descriptions in U.S. Pat. Nos. 3,465,319; 3,047,539 and 3,692,744 are helpful. Procedures for preparing the branched polyesters will be detailed hereinafter.

The general procedure for making the starting resins is a condensation in the melt state, using an excess of the diol and a dialkyl terephthalate or terephthalic acid and any desired branching component. Heat (250°–260° C.) and high vacuum (0.2–1.0 mm Hg) are used for a long enough time, e.g., 3 to 12 hours, to build the molecular weight by eliminating volatile by products.

The thermoplastic poly(ester-urethanes) are the reaction product obtained by heating a mixture comprising as essential polyesterurethane forming materials:

(1) one mole of an essentially linear hydroxyl terminated polyester of a saturated, aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10; and (2) from about 1.1 to 3.1 moles of a diphenyl diisocyanate having an isocyanate group on each phenyl nucleus in the presence of from about 0.1 to 2.1 moles of a saturated aliphatic free glycol containing from 4 to 10 carbon atoms and having hydroxyl groups on its terminal carbon atoms.

The preferred poly(ester-urethanes) are those which are the reaction product of (1) one mole of an essentially hydroxyl terminated poly(tetramethylene adipate) having a molecular weight of from about 700 to 1100 and an acid number of less than 5 and containing (2) from about 0.6 to about 1.1 moles of a free glycol of the formula $HO(CH_2)_xOH$ wherein x is a number from 4 to 8, said polyester and said free glycol having a combined hydroxyl number of between about 200° and 240°, and (3) from 1.6 to 2.1 moles of a diphenyl diisocyanate having an isocyanate group on each phenyl nucleus, the combined molar amount of said polyester and said free glycol being essentially equivalent to the molar amount of said diisocyanate whereby there are essentially no unreacted groups of the class consisting of isocyanate and hydroxyl groups in said reaction product. The basic polyesters that may be employed in preparing the poly(ester-urethane) include those polyesters prepared from the esterification of such dicarboxylic acids as adipic, succinic, pimelic, suberic, azelaic, sebacic and the like or their anhydrides. The preferred acids are those dicarboxylic acids of the formula HOOC—R—COOH, where R is an alkylene radical containing 2 to 8 carbon atoms. More preferred are those represented by the formula $HOOC(CH_2)_xCOOH$, where x is a number from 2 to 8. Adipic acid is preferred.

The glycols should be straight chain glycols containing between 4 and 10 carbon atoms such as 1,4-butanediol, 1,6-hexamethylenediol, 1,8-octamethylenediol and the like. In general, the glycol is preferably of the formula $HO(CH_2)_xOH$, wherein x is 4 to 8. The preferred glycol is 1,4-butanediol.

A free glycol is present in the polyester in an amount from about 0.1 to 2.1 moles, prior to the reaction with the diphenyl diisocyanate. The free glycol preferably is mixed with the polyester prior to reacting the polyester with the diphenyl diisocyanate. If any residual glycol is present in the polyester, this may be utilized as part of the free glycol.

The specific diisocyanates employed to react with the mixture of polyester and free glycol include diphenyl methane diisocyanate, diphenyl methane-p,p'-diisocyanate, dichlorodiphenyl methane diisocyanate, bibenzyl diisocyanate, diphenyl ether diisocyanate and the like. The preferred diphenyl diisocyanates is diphenyl methane-p,p'-diisocyanate.

The thermoplastic poly(ester-urethane) elastomers are described in U.S. Pat. No. 2,871,218 which is hereby incorporated by reference.

The compositions of the invention may comprise from 99 to 1 parts by weight of the polyester resin and the poly(ester-urethane) may comprise from 1 to 99 parts by weight of the compositions. Compositions having the optimized properties of the polyester component will include from 95 to 75 parts by weight of the polyester component and from 5 to 25 parts by weight of the poly(ester-urethane).

The compositions may be made by tumbling the components in a suitable mixing apparatus, extruding the mixed powders into a continuous strand, chopping the strands into pellets and thereafter molding the pellets into the desired shape. These techniques are well known to those skilled in the art and do not form a part of this invention.

The compositions of the present invention also may include flame retardant agents that render the compositions flame retardant. Useable flame retardants are disclosed in U.S. Pat. Nos. 3,833,685, 3,334,154 and 3,671,487 which are hereby incorporated by reference. Other flame retardants are disclosed in U.S. Pat. Nos. 3,681,281, 3,577,053, and 3,830,771 and U.K. Pat. No. 1,358,080, all of which are incorporated by reference.

In general, the flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition—major proportions will detract from physical properties—but at least sufficient to render the polyester resin composition non-burning or self-extinguishing. Those skilled in the art are well aware that the amount will vary with the nature of the resin and with the efficiency of the additive. In general, however, the amount of additive will be from 0.5 to 50 parts by weight per hundred parts of polyester and polyesterurethane. A preferred range will be from about 3 to 25 parts and an especially preferred range will be from about 8 to 12 parts of additive per 100 parts of the polyester composition. Smaller amounts of compounds highly concentrated in the elements responsible for flame-retardance will be sufficient, e.g., elemental red phosphorus will be preferred at 0.5 to 2.0 parts by weight per hundred parts of the polyester composition, while phosphorus in the form of triphenyl phosphate will be used at 25 parts of phosphate per 100 parts of the polyester composition, and so forth. Halogenated aromatics will be used at 8 to 12 parts and synergists, e.g., antimony oxide will be used at about 2 to 5 parts by weight per 100 parts of the combined polyester and polyester-urethane.

Among the useful halogen-containing compounds are those of the formula:

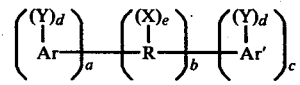

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage, and the like. Other groups which are represented by R will occur to those skilled in the art.

Ar and Ar' are mono- or polycarbocyclic aromatic groups such as phenylene, biphenylene, terephenylene, naphthylene, and the like. Ar and Ar' may be the same or different.

Y is a substituent selected from the group consisting of organic, inorganic, or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenyls of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,6-bis-(4,6-dichloronaphthyl)propane
2,2-bis-(2,6-dichlorophenyl)pentane
2,2-bis-(3,5-dichromophenyl)hexane
bis-(4-chlorphenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In place of the divalent aliphatic group in the above examples may be substituted sulfide, sulfoxy, and the like.

Included within the above structural formula are substituted benzenes exemplified by 1,3-dichlorobenzene, 1,4-dibromobenzene, 1,3-dichloro-4-hydroxybenzene, hexachlorobenzene, hexabromobenzene, and biphenyls such as 2,2'-dichlorobiphenyl, 2,4'-dibromobiphenyl, and 2,4'-dichlorobiphenyl.

Aromatic carbonate homopolymers having repeating units of the formula:

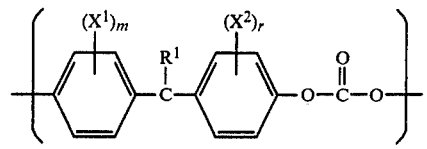

wherein $R^1$ and $R^2$ are hydrogen, (lower)alkyl or phenyl, $X^1$ and $X^2$ are bromo or chloro and m and r are from 1 to 4. These materials may be prepared by techniques well known to those skilled in the art.

Also aromatic carbonate copolymers in which from 25 to 75 wt. percent of the repeating units comprise chloro- or bromo-substituted dihydric phenol, glycol or dicarboxylic acid units.

The preferred halogen compounds for this invention are aromatic halogen compounds such as halogenated polycarbonates, chlorinated benzene, brominated benzene, chlorinated biphenyl, chlorinated terphenyl, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing.

Especially preferred are the halogenated polycarbonates either, alone, or mixed with antimony oxide.

In general, the preferred phosphate compounds are selected from elemental phosphorus or organic phosphonic acids, phosphonates, phosphinates, phosphonites, phosphinites, phosphine oxides, phosphines, phosphites or phosphates. Illustrative are triphenyl phosphine oxide. This can be used alone or mixed with hexabromobenzene or a chlorinated biphenyl and, optionally, antimony oxide.

Typical or the preferred phosphorus compounds to be employed in this invention would be those having the general formula:

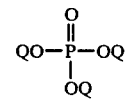

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said R's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)phenyl phosphate, tri(nonyl-phenyl)phosphate, phenylmethyl hydrogen phosphate, di(dodecyl) p-tolyl phosphate, tricresyl phosphate, triphenyl phosphate, dibutylphenyl phosphate, 2-chloroethyldephenyl phosphate, p-tolyl bis(2,5,5'-trimethylhexyl)phosphate, 2-ethylhexyldiphenyl phosphate, diphenyl hydrogen phosphate, and the like. The preferred phosphates are those where each R is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis(hydroxymethyl) phosphonium chloride. These flame-retardant additives are commercially available.

As reinforcing fillers, there may be employed reinforcing amounts of reinforcing filler. In general, any reinforcement can be used, e.g., aluminum, iron or nickel, and the like, and non-metals, e.g., carbon filaments, silicates, such as acicular calcium silicate, magnesium silicate, asbestos, $TiO_2$, potassium titanate and titanate whiskers, glass flakes and fibers and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the reinforced embodiments of the invention.

In particular, the preferred reinforcing fillers are of glass and it is preferred to use fibrous glass filaments comprises of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125 (⅛").

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame retardant. Sizings, if present, can readily be removed by heat cleaning or other techniques well known to those skilled in the art.

DESCRIPTION OF THE PREFERRED EMBODIMENTS

EXAMPLE I

Compositions were prepared from poly(1,4-butylene terephthalate) having a melt viscosity of 6500 poise, a poly(ester-urethane) derived from diphenyl methane p,p'-diisocyanate, 1,4-butanediol and poly(1,4-butylene adipate)* by extruding the polymers at 480° F., chopping the extrudate and molding the chopped extrudate into test pieces. The test pieces had the following physical properties. (All proportions are in parts by weight).
*Estane 58109, B. F. Goodrich

|  | 1** | 2 | 3 |
| --- | --- | --- | --- |
| poly(ester-urethane) | 0 | 5 | 10 |
| poly(1,4-butylene terephthalate) | 99.8 | 94.8 | 89.8 |
| Stabilizers*** | 0.2 | 0.2 | 0.2 |
| % Glass by ash | 0 | 0 | 0 |
| Specific Gravity | 1.310 | 1.306 | 1.299 |
| Tensile Strength, psi | 7,500 | 7,040 | 6,340 |
| Elongation at Break % | 300 | 284 | 318 |
| Heat Deflection Temperature, °F. | | | |
| at 66 psi | 310 | 291 | 249 |
| at 132 psi | 190 | 173 | 156 |
| at 198 psi | 140 | 138 | 147 |
| at 264 psi | 130 | 126 | 126 |
| Notched Izod Impact Strength, ft-lbs/in | 0.9 | 0.9 | 1.6 |
| Tensile Impact Strength | | | |
| Type L Samples | 185 | 169 | 147 |
| Type S Samples | 80 | 70 | 78 |
| Gardner Impact Strength in-lbs/⅛" thick sample | | | |
| Bottom Surface | 480 | 480 | 480 |
| Top Surface | 480 | 480 | 480 |
| Flexural Modulus, psi | 340,000 | 320,000 | 284,500 |
| Flexural Strength, psi | 12,800 | 11,080 | 10,030 |

**control
***0.15% tetrakis(3-(3',5'-di-t-butyl-4'-hydroxyphenyl) propionoyloxymethyl methane 0.05% diphenyl decyl phosphite

EXAMPLE II

Compositions were prepared as described in Example I, except that a poly(1,4-butylene terephthalate) having a melt viscosity of 3000 poise was employed and glass fiber reinforcement was used at the indicated level. The test pieces had the following physical properties. (All proportions are in parts by weight).

|  | 4 | 5 | 6 | 7* |
| --- | --- | --- | --- | --- |
| poly(ester-urethane) | 10 | 10 | 10 | 0 |
| poly(1,4-butylene terephthalate) | 69.8 | 59.8 | 49.8 | 69.8 |
| Glass Fibers | 20 | 30 | 40 | 30 |
| Stabilizers | 0.2 | 0.2 | 0.2 | 0.2 |
| % Glass By Ash | 20.2 | 31.1 | 41.5 | 30 |
| Specific Gravity | 1.441 | 1.530 | 1.627 | 1.52 |
| Tensile Strength, psi | 11,580 | 12,860 | 12,740 | 17,000 |
| Elongation at Break % | 7.5 | 6.6 | 5.7 | 5.0 |
| Heat Deflection Temperature, °F. | | | | |

| -continued | | | | |
|---|---|---|---|---|
| | 4 | 5 | 6 | 7* |
| at 66 psi | 425 | 429 | 427 | 420 |
| at 132 psi | 399 | 402 | 409 | 418 |
| at 198 psi | 374 | 388 | 391 | 417 |
| at 264 psi | 352 | 365 | 372 | 415 |
| Notched Izod Impact Strength, ft-lbs/in. | 2.0 | 2.6 | 3.1 | 1.6 |
| Unnotched Izod Impact Strength ft-lbs/in | 12.4 | 13.4 | 13.3 | 11 |
| Tensile Impact Strength | | | | |
| Type L Samples | 54 | 70 | 74 | 55 |
| Type S Samples | 43 | 62 | 77 | 37 |
| Gardner Impact Strength in-lbs/⅛" thick sample | | | | |
| Bottom Surface | 6 | 6 | 6 | 8 |
| Top Surface | 30 | 41 | 50 | 30 |
| Flexural Modulus, psi | 608,000 | 856,000 | 1,011,000 | 1,200,000 |
| Flexural Strength, psi | 17,440 | 18,890 | 19,820 | 27,000 |

Other modifications and variations of the present invention are possible in the light of the above teachings. It is, therefore, to be understood that changes may be made in the particular embodiments of the invention described which are within the full intended scope of the invention as defined by the appended claims.

I claim:

1. A thermoplastic molding composition which comprises:
   (a) from 95 to 75 parts by weight of poly(1,4-butylene terephthalate); and
   (b) from 5 to 25 parts by weight of a thermoplastic poly(ester-urethane) elastomer.

2. A composition as defined in claim 1 wherein said thermoplastic poly(ester-urethane) is the reaction product obtained by heating a mixture comprising as essential polyester-urethane forming ingredients (1) one mole of an essentially linear hydroxyl terminated polyester of a saturated, aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 moles of a diphenyl diisocyanate having an isocyanate group on each phenyl nucleus in the presence of from about 0.1 to 2.1 moles of a saturated aliphatic free glycol containing from 4 to 10 carbon atoms and having hydroxyl groups on its terminal carbon atoms.

3. A composition as defined in claim 2 wherein said thermoplastic poly(ester-urethane) is the reaction product of (1) one mole of an essentially hydroxyl terminated poly(tetramethylene adipate) having a molecular weight of from about 700 to 1100 and an acid number of less than 5 and containing (2) from about 0.6 to 1.1 moles of a free glycol of the formula $HO(CH_2)_xOH$ wherein x is a number from 4 to 8, said polyester and said free glycol having a combined hydroxyl number of between about 200 and 240, and (3) from 1.6 to 2.1 moles of a diphenyl diisocyanate having an isocyanate group on each phenyl nucleus, the combined molar amount of said polyester and said free glycol being essentially equivalent to the molar amount of said diisocyanate whereby there are essentially no unreacted groups of the class consisting of isocyanate and hydroxyl groups in said reaction product.

4. A composition as defined in claim 3 wherein the glycol is 1,4-butanediol.

5. A composition as defined in claim 4 wherein the diphenyl diisocyanate is diphenyl methane p,p'-diisocyanate.

6. A composition as defined in claim 1 which includes a reinforcing amount of a reinforcing filler.

7. A composition as defined in claim 6 wherein the reinforcing filler comprises filamentous glass.

8. A composition as defined in claim 1 which includes a flame retardant amount of a flame retardant agent.

* * * * *